(No Model.) 4 Sheets—Sheet 1.

W. A. KNIGHT.
BARRING DEVICE FOR BUTTON HOLE SEWING MACHINES.

No. 394,580. Patented Dec. 18, 1888.

Witnesses:
D. J. Conner Jr.
V. E. Hodges

Wm. A. Knight,
Inventor.

(No Model.) 4 Sheets—Sheet 2.
W. A. KNIGHT.
BARRING DEVICE FOR BUTTON HOLE SEWING MACHINES.

No. 394,580. Patented Dec. 18, 1888.

Witnesses.

Wm. A. Knight,
Inventor (No Model.) 4 Sheets—Sheet 3.
W. A. KNIGHT.
BARRING DEVICE FOR BUTTON HOLE SEWING MACHINES.
No. 394,580. Patented Dec. 18, 1888.

Witnesses:

Wm. A. Knight, Inventor (No Model.) 4 Sheets—Sheet 4.
W. A. KNIGHT.
BARRING DEVICE FOR BUTTON HOLE SEWING MACHINES.
No. 394,580. Patented Dec. 18, 1888.
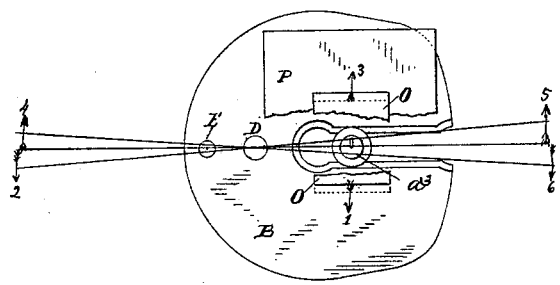
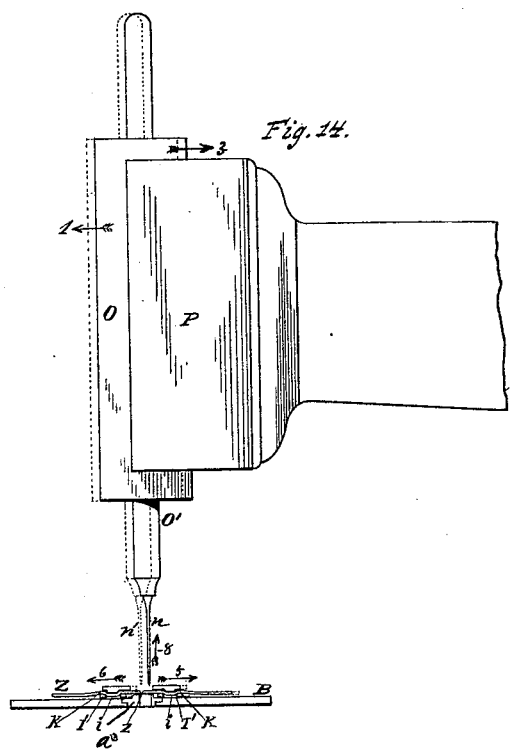
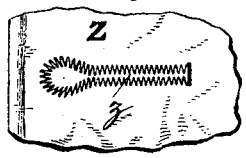
Witnesses:
D. A. Conner Jr.
V. E. Hodges
Wm A. Knight,
Inventor.
by Henry Baker
Atty.

UNITED STATES PATENT OFFICE.

WILLIAM A. KNIGHT, OF ALBANY, NEW YORK, ASSIGNOR TO THE SINGER MANUFACTURING COMPANY OF NEW JERSEY.

BARRING DEVICE FOR BUTTON-HOLE SEWING-MACHINES.

SPECIFICATION forming part of Letters Patent No. 394,580, dated December 18, 1888.

Application filed July 8, 1887. Serial No. 243,776. (No model.)

*To all whom it may concern:*

Be it known that I, WILLIAM A. KNIGHT, a citizen of the United States, residing at Albany, in the county of Albany and State of New York, have invented certain new and useful Improvements in Button-Hole Sewing-Machines, of which the following is a specification, reference being had therein to the accompanying drawings.

The objects of my invention are, primarily, to provide means for automatically completing the working of button-holes in fabrics and leather by finishing the same with barring-stitches by the machine, and thereby obviate the necessity of barring the button-holes by hand, as heretofore required, and, secondarily, to provide a clamp by which the material having the button-hole will be held in a proper manner while the button-hole is being worked. I attain these objects by the means illustrated in the accompanying drawings, forming a part of this specification, in which—

Figure 1:
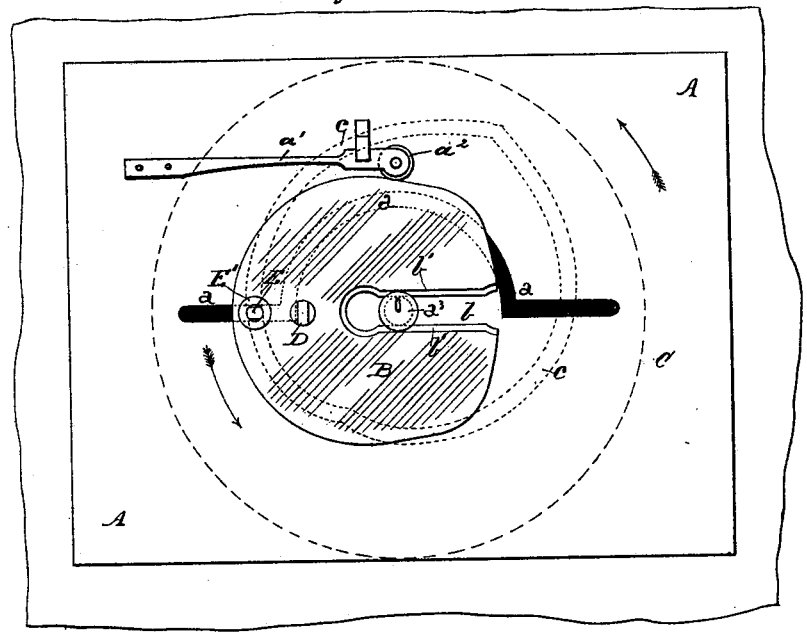
Figure 2:
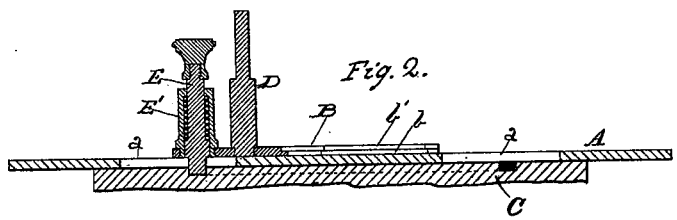
Figure 3:
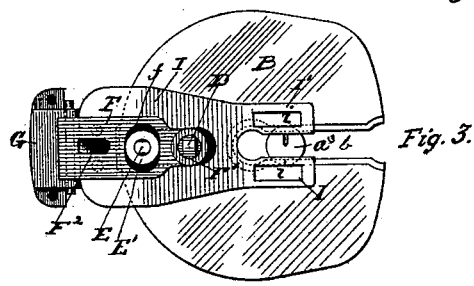
Figure 4:
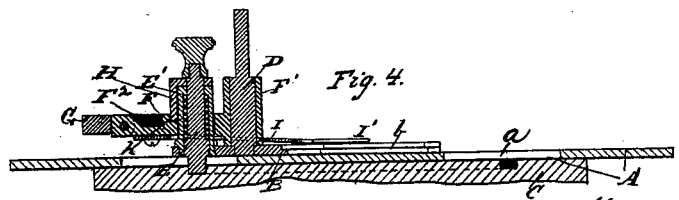
Figure 5:
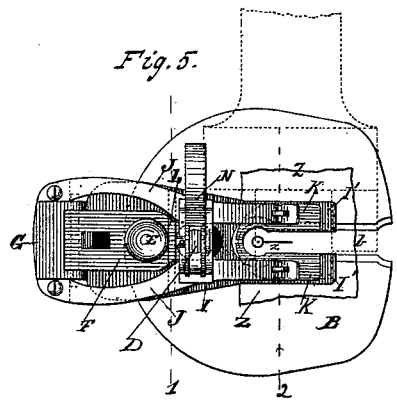
Figure 7:
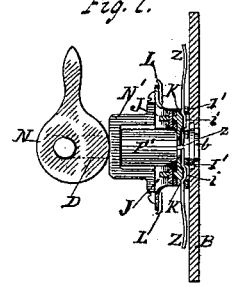
Figure 8:
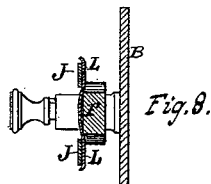
Figures 9, 10:
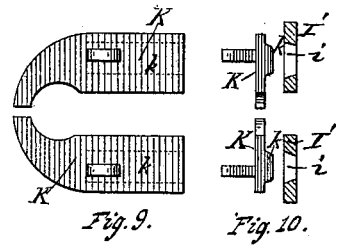
Figure 6:
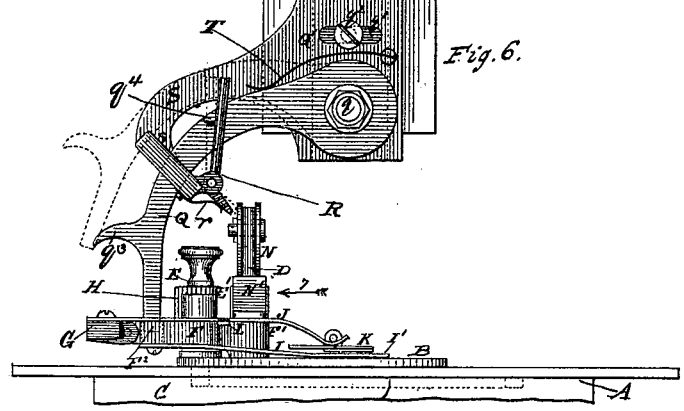
Figure 11:
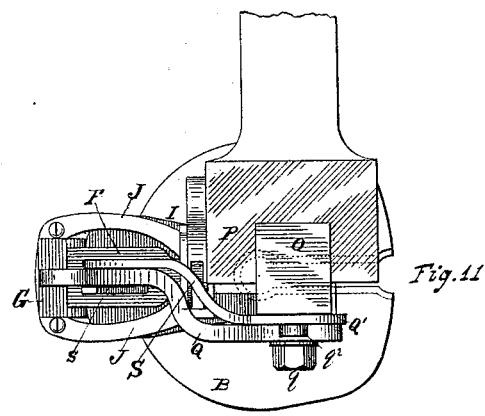
Figure 12:
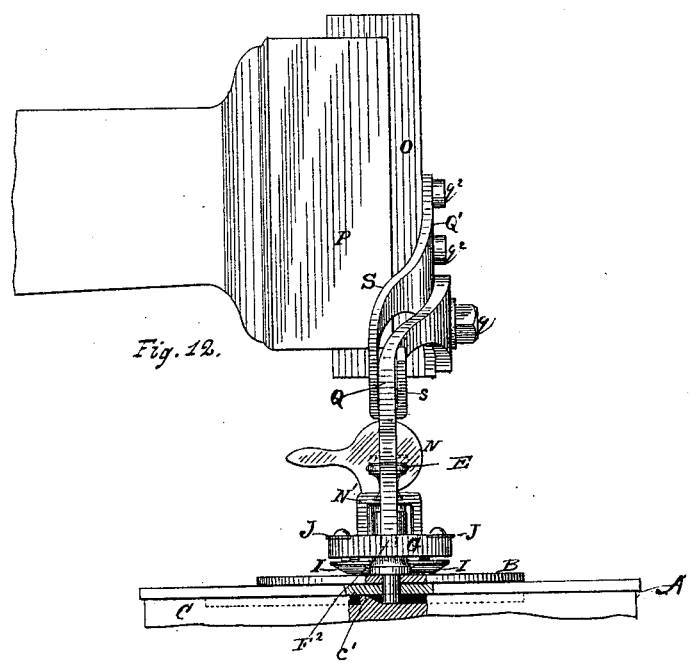

Figure 1 illustrates the base-plate of a machine, the feed-wheel, clamp base-plate, and its guide-pin and post all being in plan view. Fig. 2 is a sectional elevation of the same. Fig. 3 is a plan view of the clamp base-plate and parts fixed to the same and the vibrating arm which carries the lower clamping-arms. Fig. 4 is a sectional elevation of the same and of the feed-wheel. Fig. 5 is a plan view of the complete button-hole clamp, with the head of the machine shown in dotted lines. Fig. 6 is a side elevation of the same and the head of the machine and the mechanism which connects the clamp with a moving part of the machine for operating the clamping devices. Fig. 7 is an end elevation of the botton-hole clamp. Fig. 8 is a cross-sectional view taken at line 1 in Fig. 5. Fig. 9 is a plan view, on an enlarged scale, of the presser-feet of the clamp. Fig. 10 is a cross-sectional view of the presser-feet and lower clamping-arms at line 2 in Fig. 5. Fig. 11 is a plan view of my invention in connection with the head of the button-hole sewing-machine. Fig. 12 is a view of the same from the rear side of the machine. Fig. 13 is a plan view illustrating the operation of the pivoted clamping arms or jaws when the bar-stitching is being done. Fig. 14 is a front view, also illustrating the operation of my invention. Fig. 15 illustrates a button-hole automatically barred on my machine.

A is the work-plate of a button-hole sewing-machine, provided with the usual guiding-slot, $a$, and clamp base-plate supporting-spring $a'$ and roller $a^2$, and having the usual guide-button, $a^3$.

B is the clamp base-plate, provided with a slot, $b$, which is bounded on its marginal edges by a recessed way, forming a lip, $b'$, which engages the undercut guide-button $a^3$.

C is the feed-wheel, revolving below plate A, and provided with feeding-grooves $c$, of any form, as heretofore employed.

D is the presser bridge-post secured to clamp base-plate B, and serving in this case as a pivot on which the clamping arms or jaws are vibrated, as will be hereinafter described.

E is the clamp guide-pin, vertically movable in the pin-post E', and pressed down through the slot $a$ in the work-plate into the groove $c$ of the feed-wheel C. The purpose and mode of operation of this guide-pin are so well known that no particular description is required.

F, Figs. 3 and 4, is a clamp vibrating arm provided with a sleeve, F', and having a clamping-arm head, G, hinged to its rear end. This arm F is pivoted by its sleeve F' to the bridge-post D, the said arm being provided with an orifice, $f$, of size and form which will freely admit the pin-post E' and allow said arm to vibrate without touching said pin-post to a distance of about one-eighth of an inch. This arm F is also provided with a recess or perforation, $F^2$, the purpose of which will be hereinafter described.

H is a steadying pin or key, which is movable in a vertical direction in relation to arm F, and is attached, preferably, to the clamp guide-pin E, so as to be adapted to be lifted with the same. The lower end of this steadying-key enters a recess or hole, $h$, made in arm F, and has its sides supported in a vertical groove made in the side of the pin-post E'. When this key is in engagement with arm F', the latter will be held from vibrating, and when out of engagement with said arm the latter will be permitted to vibrate freely from the bridge-post D or other proper pivot.

I is the lower clamping-piece, which is secured to arm F, preferably from its lower side, and has its forward ends provided with clamping-arms I' I', the lower sides of which rest on clamp base-plate B. Made in the upper sides of these clamping-arms I' are recesses or slots $i$, having beveled sides. (See Fig. 10.) The purpose of these recesses or slots will be hereinafter fully described.

J J are the upper clamping-arms, which are rigidly secured to head G, hinged to arm F.

K K are clamping or presser feet, which are jointed to the forward ends of arms J J from their lower sides in any proper manner. The feet K are preferably provided with downwardly-extending projections or portions $k$, having a length and width a little less than that of the recesses or slots $i$ in the lower clamping-arms, I, said projections being arranged over the said recesses or slots. These projections I denominate "spreaders." When the material to be operated upon is placed between arms I' and feet J, these spreaders will operate, when said feet are pressed down, to press down the material lying over the slots or recesses $i$ into the same to a short distance and draw apart the edges of the button-hole cut $z$ in the fabric Z a short distance. These spreaders also co-operate with the slots $i$ to hold the material from shifting or the feet from sliding in either direction, and thus obviate the necessity of grooving the lower sides of the feet, as heretofore. They also obviate the necessity of employing special mechanism for spreading the button-hole cut after the material has been clamped, as heretofore required.

L is a spring arranged across arm F and extended each way beneath the clamping-arms J J. This spring operates to raise arms J when relieved of pressure and obviates the use of special mechanism to be operated for raising said arms and releasing the material from between the clamping device.

N is a presser-cam or cam-lever, pivoted in the usual manner on the bridge-post D and over the bridge N', resting on the upper clamping-arms, J J, as heretofore employed, for forcing said arms down to cause the clamping-feet and their projections or spreaders $k$ to clamp the material down on the arms I' I' and hold the sides of the button-holes apart.

In Figs. 7 and 14, Z represents a piece of fabric or leather arranged between feet K K and arms I' I', and $z$ is a button-hole cut made in this material. The clamping-feet K K are shown to be pressed down, with their projections or spreaders $k$ $k$ pressing the portion of the material beneath them to a short distance down into slots or recesses $i$ $i$ in arms I' I', so as to draw the side margins of the material cut, $z$, a little apart and sufficiently to allow the needle to freely pass down through the cut without touching the sides thereof.

If preferred, notches made in the arms I' I' from their outer side edges may be substituted for the slots or recesses $i$ $i$; but the latter are preferred, as the arms will be stronger.

From the foregoing it will be apparent that the work-clamp or work-holding device comprises the lower clamping-arms, I I, and the upper clamping-arms, J J, with their feet K K, the work being held between the said feet and the lower arms, I I.

It is well known that in button-hole machines the needle-bar is reciprocated horizontally while it is being operated with a vertical reciprocating motion, so as to cause the needle to be moved laterally and alternately away from and toward the head of the machine when descending to pierce the material in working the button-hole. A description of this operation is therefore unnecessary. In some machines this horizontal movement of the needle-bar is effected by mechanism which will move a needle-bar carrier, in which the needle-bar reciprocates vertically alternately outward from the head of the machine and back in a horizontal direction.

I have preferred to illustrate my invention in connection with a "Singer" machine, though it is applicable for use with other machines by modifying parts which connect the button-hole clamp with the moving parts of the machine which operate to move the needle-bar carrier or equivalent device with a reciprocating motion for carrying the needle-bar and needle alternately from and toward the head of the machine and over the plate-button. I will therefore proceed to describe my invention in connection with a button-hole sewing-machine having a horizontally-reciprocating needle-bar carrier to illustrate my invention in its essential and material parts.

O is the horizontal reciprocating needle-bar carrier.

O' is the needle-bar.

P is the head of the machine, in which the carrier moves alternately in the directions indicated by the arrows 1 and 3 in Figs. 13 and 14.

Q is a dog or lever connected with the carrier O by a pivot-pin, $q$, so as to adapt it to be moved from the position shown in full lines to that indicated by dotted lines in Fig. 6 and the reverse. This pivot-pin $q$ may be attached directly to the carrier O; but I prefer the construction illustrated in the drawings, in which the said pivot-pin is shown as being attached to an adjustable plate, Q', having slots $q'$ and secured to the carrier by screws $q^2$, passing through the said slots $q'$ into the carrier O.

The dog Q is shown in full lines as being engaged with the vibrating arm F by its lower end entering the recess or orifice $F^2$ in the said arm. (See Fig. 6.) It will be readily understood that when the dog is engaged with the vibrating arm F the movement of the carrier O in the direction indicated by arrow 1, Fig. 13, will through said dog move arm F in the direction denoted by arrow 2, and a reverse movement of the said carrier, as in the direction of arrow 3, will move said arm in the direction of arrow 4, and it will be understood that when arm F is moved alternately in the directions of arrows 2 and 4 the clamping-arms I and J will be moved alternately in opposite directions, as indicated by arrows 5 and 6.

When the carrier O is moved out from head P in the direction denoted by arrow 1, the needle-bar O' will be carried outward to descend and pass through the slit or opening $z$ of the button-hole cut in the fabric or leather Z when the clamping arms and feet are not vibrated; but when said arms or feet are vibrated by means of dog Q, through arm F, the movement of said clamping devices in the direction of arrow 5, Fig. 13, will carry the fabric Z to a distance equal to the throw of the needle in the direction of arrow 1, and this simultaneous movement of the needle and the fabric in opposite directions will cause the needle to pierce the fabric at a point past the line of the button-hole cut $z$ to a distance equal to the depth of the stitches at the side of the button-hole and produce a barring-stitch across the end of the button-hole. When the needle is again lifted, the carrier will move back in the direction of arrow 3 and carry dog Q with it and vibrate the clamping arms and feet in direction of arrow 6, so that when the needle again descends it will be thrust down through the fabric at the opposite side of the button-hole cut and make another barring-stitch across the end of the button-hole, and these operations will be repeated until the preferred number of barring or finishing stitches have been made.

S is an arm extending from the adjustable plate Q', and provided at its rear end with a guide, $s$, having a holding slot or recess within which the dog Q will be received and held when it is in engagement with the arm F of the clamp. This arm S, with its holding device $s$, re-enforces or steadies the dog Q when operated by the carrier to vibrate arm F and its attached clamping-arms I and feet K.

R is a trip-lever which is pivoted to a projection at the lower end of the guide $s$, the said lever being normally retained in the position denoted by dotted lines, Fig. 6, by the spring $r$, which presses against the lower arm of the said lever. The dog Q is provided with a projection, $q^4$, which, when the said dog is lifted to the position indicated by dotted lines, Fig. 6, rests on the top of the trip-lever R, and thus holds the said dog up; but when the tripping-lever is engaged by some part moving with the clamp and is thrown into the position shown by full lines, Fig. 6, the said lever will be clear of the said projections, and the spring T, pressing on the top of the dog Q, will force the said dog quickly downward, so that its lower end will enter the slot $F^2$ in the arm F to cause the pivoted jaws of the clamp to be vibrated.

It is to be understood that the engagement of the dog Q with vibrating arm F will not be effected until the feed of the machine is stopped, or is about within one stitch of being stopped.

Heretofore the stoppage of the feed movement of the clamp was required to be effected by the operator after stopping the machine, when he would pull the clamp guide-pin E up out of feed-groove $c$ in feed-wheel C. In this invention I provide automatic means for effecting the required stoppage of the feeding movement of the clamp at the time when the working of the button-hole has been about completed, or is within one stitch of being completed.

Fixed in feed-groove $c$ of the feed-wheel, so as to fill up the same to the plane of the upper side surface of that wheel, is the inclined projection or riser $c'$, Fig. 12.

In the usual operation of working an eyed button-hole on a machine the work-clamp is first given a straight feeding movement to work one side of the button-hole, then a semicircular feeding movement to work the eye of the button-hole, and then a second straight feeding movement to work the other side of the button-hole. When the last side of the button-hole is within one stitch of being finished, the inclined projection or riser $c'$ in the feed-groove $c$ of the feed-wheel C will be carried to the lower end of the clamp guide-pin E, and in the further forward movement of the feed-wheel and its feed-groove to a distance for moving the clamp to the distance of the length of one stitch this riser $c'$ will be carried fully beneath the lower end of the guide-pin E and lift the same to the plane of the upper side surface of the feed-wheel and fully out from engagement with the feed-groove $c$ by the time the last working stitch has been taken. In the lifting of this guide-pin E by riser $c'$ the steadying-key H will be lifted out of engagement with notch $h$ in arm F, so as to permit said arm to be vibrated and effect a vibration of the clamping-arms I and feet K, holding the material. When the last button-hole-working stitch is being made the clamp-plate will be moved to the distance of the length of a single stitch in the direction of arrow 7, Fig. 6, and this movement will carry some piece or portion of the clamp (such as presser-cam N) against the lower end of tripping-lever R and throw the upper end of this lever out from under the supporting projection $q^4$ of the lifted dog Q, when spring T will operate to quickly throw the dog down to enter the recess $F^2$ in arm F. This engagement of the dog with said arm will be effected just at the time the needle $n$ is descending to carry the thread down to complete the last working stitch.

Figs. 13 and 14 illustrate the motions of the operating parts for making the barring-stitches. In Fig. 14 the needle $n$ is shown as being lifted to clear the material Z and raised in direction of arrow 8, while at the same time the carrier O is being moved in direction of arrow 1, and the needle is being carried in a corresponding direction outward from full lines to that of dotted lines $n'$. When the needle has been fully raised, the needle-bar carrier O and the dog Q moving therewith will be moved fully outward, so that the material Z held by the clamp will be made to move in direction of arrow 5, Figs. 13 and 14, to a distance equal to the distance the carrier moves the needle outward, and when the needle descends in the line shown by dotted lines $n'$ in Fig. 14 it will be thrust through the material Z at a point outward past the button-hole slit $z$ and make a barring-stitch across the end of the button-hole equal to the distance of the depth of the working of the button-hole at the opposite side of cut $z$. When the needle is again raised, it will be carried back from the position indicated by dotted lines $n'$ to that of full lines by carrier O at the same time the dog Q is operating to move the clamped material outward and in direction of arrow 6 in Figs. 13 and 14, when the needle will again descend and be thrust down through the material at a point opposite and inward past the slit $z$ to a distance equal to the depth of the working of the sides of the button-hole and produce a second barring-stitch. Thus it will be understood that the horizontal vibrating movements of the outer end of the work-clamp are in opposition to the horizontal or in-and-out movement of the needle-bar, so that the barring-stitches X will be twice as long as the ordinary overedge stitches $x'$, and will therefore extend from one side to the other of the said stitches, as shown in Fig. 15.

It should be understood that the inclined projection or riser $c'$ is to be placed in the feed-groove $c$ of the feed-wheel at such a point as will be required to correspond with the length of the button-hole to be worked. When the length of the button-hole is greater, this riser will be placed farther along on the throw of the feed-groove, and when the length of the button-hole is to be less this riser is to be set correspondingly nearer the turning portion of this feed-groove.

When the bar-stitches have been made, the operator will, with one finger, raise dog Q by lifting upon finger-piece $q^3$ and carry it up so that catch or projection $q^4$ will rest upon the upper end of trip-lever R. The operator will then, with clamp guide-pin E, swing the clamp around in position for working another button-hole, and then throw presser-cam N over to release arms J J and remove the material from between the clamp.

Having thus described my invention, I claim and desire to secure by Letters Patent—

1. In a button-hole sewing-machine, the combination, with the clamp base-plate and the upper and lower clamping-jaws having a vertical pivotal connection with the said base-plate and being thus adapted to be vibrated horizontally, of the spring-pressed clamp guide-pin E, the work-plate A, having the guiding-slot $a$, through which said pin extends, a steadying or locking key, H, engaging the clamping-arms or a part connected therewith, and being also engaged by the vertically-movable guide-pin E, a feed-wheel having a groove into which said pin extends, an incline or riser, as $c'$, for automatically lifting said pin and locking-key, and means for vibrating said clamping-jaws beneath the needle when they are freed by the lifting of said locking-key, as set forth.

2. In a clamp for button-hole sewing-machines, the combination, with the bridge-post of the clamp and an arm pivoted to said post and carrying clamping feet and arms, and provided with a recess, $h$, of the steadying-key H, carried by the clamp guide-pin, so that the latter is adapted to lift said key out of engagement with the said recess in said pivoted arm, substantially as set forth.

3. In a machine for working button-holes, the combination, with the work-plate provided with a guiding-groove, a feed-wheel provided with a feeding-groove, and a riser or incline, of a button-hole clamp which is provided with a spring-held guide-pin engaging with said guiding-groove, substantially as set forth.

4. In a machine for working button-holes, the combination, with the work-plate provided with a guiding-groove, and a feed-wheel provided with a groove and a riser or incline, of the button-hole clamp provided with a clamp guide-pin engaging with said guiding-groove, clamping-arms, a pivoted arm, as F, to which the said clamping-arms are attached, a vertically and horizontally reciprocating needle-bar, and a steadying-key operated by the guide-pin for engagement with and disengagement from the said arm F, substantially as set forth.

5. In a button-hole sewing-machine, the combination, with a needle-bar carrier which operates to give the needle-bar a horizontal reciprocating movement, of a button-hole clamp having pivoted clamping-arms attached to the clamp base-plate and serving to hold the material and to move the same back and forth when the working of the button-hole has been completed, a pivoted dog, Q, connected with the said needle-bar carrier and adapted to vibrate the said clamping-arms, means for holding the said dog out of engagement with said clamp, a tripping device, as lever R, for releasing said dog, and a part, as cam N, moving with the clamp, for operating said tripping device to throw the said dog into operation to vibrate the clamping-arms, substantially as set forth.

6. In a button-hole sewing-machine, the combination, with the needle-bar carrier, of a dog connected therewith, a work-clamp having a pivoted arm, clamping-arms attached to said pivoted arm, a trip-lever to hold said dog out of engagement with said pivoted arm, and a part or projection, as cam-lever N, on the said work-clamp arranged to engage and release said dog when the stitching of the last side of the button-hole is about completed, substantially as set forth.

7. In a button-hole sewing-machine, a button-hole clamp having pivoted clamping-arms to be vibrated when the button-hole has been worked, combined with dog Q, the spring T, the trip-lever R, the arm S, having the guide s, to which the said lever is pivoted, the plate Q', and the needle-bar carrier O, substantially as set forth.

8. In a button-hole sewing-machine, the combination, with the needle-bar carrier O and dog Q, of the adjustable plate Q', having arm S, which is provided with a holding-guide adapted to receive the said dog and steady the same when being moved by the said carrier, substantially as set forth.

9. In a button-hole sewing-machine, the combination of a button-hole clamp having vertically-pivoted clamping-arms, a device for holding said arms from vibrating while the machine is working a button-hole, a device, as riser or incline c', carried by the feed-wheel, which will release said clamping-arms from the engagement of the holding device, so that the said arms will be free to vibrate, a dog to vibrate said clamping-arms, a horizontally-reciprocating needle-bar, a moving part to which the said dog is attached, and mechanism, as cam N, trip-lever R, and spring T, which will effect an engagement of said dog with the vibrating portions of the clamp at the time the working of the button-hole is completed, whereby the machine will be made to finish the button-hole with barring-stitches, in the manner set forth, substantially as described.

10. In a clamp for button-hole sewing-machines, the combination, with clamp base-plate and the lower clamping-arms, I', having the beveled or upwardly-flaring slot i, of the clamping-feet K, provided on their under sides with the tapered projections or spreaders k, the upper clamping-arms, J, to the forward ends of which the said feet K are jointed, the presser-bridge N', cam N, and post D, substantially as set forth.

In testimony whereof I affix my signature in presence of two witnesses.

WILLIAM A. KNIGHT.

Witnesses:
W. H. CAIN,
EDWIN W. OBER.